July 4, 1967 C. D. BARNES ETAL 3,329,940
MAGNETIC CORE STORAGE DEVICE HAVING A SINGLE WINDING
FOR BOTH THE SENSING AND INHIBIT FUNCTION
Filed June 20, 1963 5 Sheets-Sheet 1

INVENTORS
CREIGHTON D. BARNES
RICHARD H. DREW
RICHARD L. RAMONT
JAMES E. SMITH
BY
A. M. Fernandez
ATTORNEY

INVENTORS
CREIGHTON D. BARNES
RICHARD H. DREW
RICHARD L. RAMONT
JAMES E. SMITH

BY A. M. Fernandez
ATTORNEY

INVENTORS
CREIGHTON D. BARNES
RICHARD H. DREW
RICHARD L. RAMONT
JAMES E. SMITH
BY
A. M. Fernandez
ATTORNEY INVENTORS
CREIGHTON D. BARNES
RICHARD H. DREW
RICHARD L. RAMONT
JAMES E. SMITH
BY
A. M. Fernandez
ATTORNEY INVENTORS
CREIGHTON D. BARNES
RICHARD H. DREW
RICHARD L. RAMONT
JAMES E. SMITH
BY
A. M. Fernandez
ATTORNEY 3,329,940

MAGNETIC CORE STORAGE DEVICE HAVING A SINGLE WINDING FOR BOTH THE SENSING AND INHIBIT FUNCTION

Creighton D. Barnes, Garden Grove, Richard L. Ramont, Richard H. Drew, and James E. Smith, Anaheim, Calif., assignors to North American Aviation, Inc.

Filed June 20, 1963, Ser. No. 289,361
1 Claim. (Cl. 340—174)

This invention relates to magnetic core storage devices, and more particularly to a coincident current memory plane in which a single winding is employed for both the sense and the inhibit function.

In a coincident current memory plane, the cores are arranged in a rectangular coordinate array of columns and rows. Each row of cores is threaded by a separate drive winding and each column is threaded by a separate drive winding orthogonal to the row drive windings. To write a binary digit 1 in a selected core, it is set away from a reference state by coincident currents driven through the row and column windings which intersect at the selected core. The row and column drive windings each conduct only half the current necessary to set the selected core away from its reference state. To read the digit stored, it is necessary to apply coincident currents of the opposite polarities thereby to reset the core to its reference state. The change in state is then sensed by a third winding referred to as a sense winding.

The sense winding is threaded through all of the cores in the plane and is connected to an amplifier. Since the half-selected cores in the row and column of the selected core are disturbed, half-select noise signals are induced in the sense winding. If all the half-select signals are of the same polarity their sum will exceed the binary 1 output signal read from the selected core. Accordingly, it has been the practice to so thread the cores that half of the half-selected cores in the row and column of the selected core produce half-select noise signals of one polarity and the remaining cores produce half-select signals of the opposite polarity. In that manner, the sum of the half-select noise signals is equal to substantially zero. A diagonal sense winding pattern is most commonly used for that purpose.

To write a binary digit 0 in a selected core, it is necessary to inhibit the action of at least one half-select current. It is not practical to inhibit a half-select current at its source, or at the row and column selecting matrix of a multi-plane memory, since the corresponding rows and columns of the planes are more economically driven by the same source. Accordingly, it has been the practice to thread the cores of each plane with a separate inhibit winding for conduction of a current equal to a row, or column, half-select current, but of the opposite polarity, to inhibit a half-select current in all cores of all rows, or columns. Thus to write a binary 0 in a selected core of a plane, the action of a half-select current in a selected row, or column, is inhibited by a current of the opposite sense through a fourth winding which threads each core of the columns or row.

An object of this invention is to provide an improved coincident current magnetic core memory.

Another object is to provide a more economical coincident current magnetic core memory.

Another object is to provide a coincident current core memory plane having only three windings through each core.

Still another object is to provide a coincident current magnetic core memory plane in which all windings are parallel to rows or columns thereof.

Another object is to provide a magnetic core memory plane in which the power required for the inhibit function may be reduced to one half of that required for a given size array.

Another object is to provide a coincident current core memory plane having a single winding for both the sense and inhibit function with cancellation of noise.

Another object is to provide a magnetic core memory plane with rejection of both half-select and common-mode noise.

These and other objects of the invention are achieved by arranging a plurality of toroidal magnetic cores in a rectangular coordinate array of rows and columns and threading the rows and columns with row and column drive windings in the usual manner. In the preferred embodiments, the sense of the column and row drive windings are alternated to facilitate making external connections to the plane along the sides thereof. A sense winding to be time shared as an inhibit winding is threaded through half of the cores in the same sense as the row, or column, select windings, and through the remaining half of the cores in the opposite sense so that half-select noise induced in the sense winding in response to the action of a half-select current in either one or both of the select windings is cancelled. The two ends of the sense winding are connected to opposite input terminals of a differential amplifier so that with neither end being referenced to ground, rejection of common-mode noise is achieved.

During a write operation the center of the sense winding is connected to ground through a switch so that half-select inhibit current may be driven through a selected half of the sense winding to inhibit the action of a half-select current in a select drive winding parallel to the sense winding. In that manner, the sense winding is also used as an inhibit winding. An advantage is that the overall power required for the inhibit function is reduced by almost a factor of two in that only one half of the cores in the array need to be inhibited at any given time.

If the cores threaded in one sense by the sense-inhibit winding are selected to include whole rows, or columns, the cancellation of half-select noise during a read operation is achieved for only the select drive winding orthogonal to the sense-inhibit winding. Therefore, to read a selected core, the select winding parallel to the sense-inhibit winding is energized first to allow the noise induced in the sense-inhibit winding by the cores disturbed before the select winding orthogonal to the sense-inhibit winding is energized. The output of the differential amplifier is then strobed to determine the digit read.

To achieve cancellation of half-select noise induced by the half-select current in the row, or column, select winding parallel to the sense inhibit winding, the cores to be threaded by the sense-inhibit winding in one sense may be selected from half of each row, or column, and the cores to be threaded in the opposite sense from the remaining half of each row, or column. The array may also be divided into quadrants and the sense-inhibit winding threaded through the cores of the quadrants in pairs such that the first half of the sense-inhibit winding is threaded through the cores of one quadrant in one sense and of the other paired quadrant in the opposite sense. If the paired quadrants are selected to be diagonally opposite to each other, the sense winding may be time shared for the inhibit function by using a bipolar inhibit driver for each half of the sense-inhibit drive winding and selecting the appropriate polarity for the inhibit current for the quadrant in which the core is being selected.

The use of bipolar inhibit drivers may be obviated by reversing the sense of the inhibit drive winding in one of the quadrants of each pair, instead of reversing the polarity of the inhibiting current therein. An advantage of doing that is full cancellation of noise from both the row and the column half-select currents is achieved during a read operation. Reversing the sense of the drive winding may be accomplished by either changing its direction through the cores or by changing the direction of the column, or row, select windings through the cores.

Other objects and advantages of the invention will become apparent from the following description with reference to the drawings in which.

Figure 1:
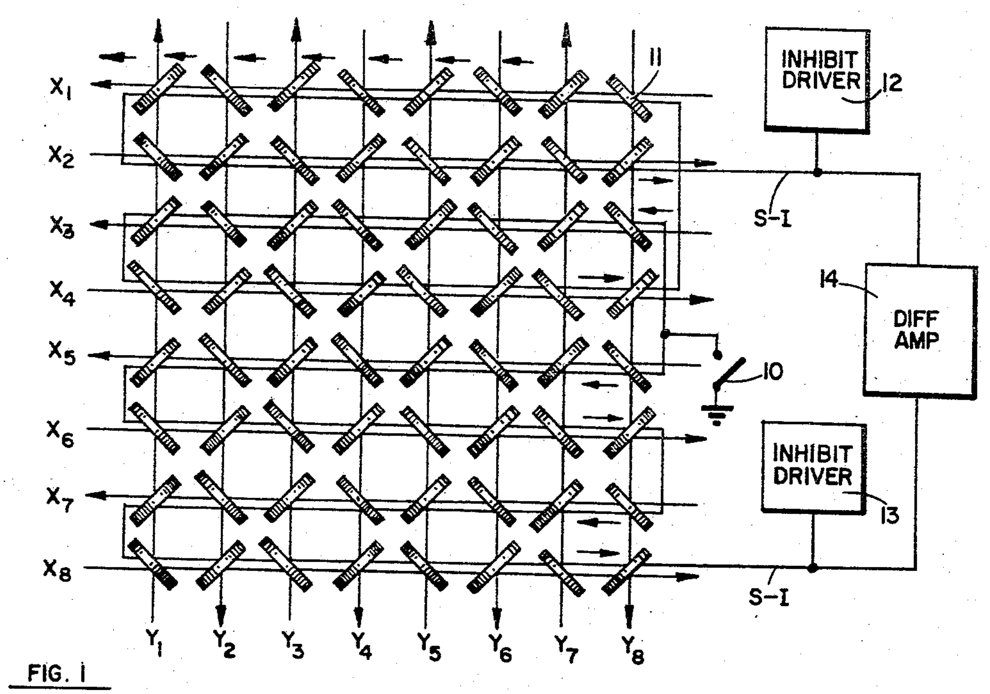
FIG. 1 is a schematic diagram of a first embodiment of the invention.

In FIG. 1 a coincident current memory plane is threaded with a sense-inhibit winding S–I threaded through all of the cores parallel to the row drive windings $X_1$ to $X_8$. It is threaded through the first four rows in a given sense and through the last four rows in the opposite sense. The sense of the winding S–I for the first four rows is selected to inhibit the action of the row half-select currents through the windings $X_1$ to $X_4$ during a write operation while a switch 10 is closed. For instance, to store a binary digit 1 in the core 11, coincident currents through the select windings $X_1$ and $Y_8$ are driven in the direction shown by the arrowheads. Accordingly, to inhibit storing a binary digit 1 in the core 11, the switch 10 is closed and an inhibit driver 12 is energized to provide positive current through the top half of the common sense-inhibit winding S–I, thereby providing a current equal to the half-select current through the select winding $X_1$ but in the opposite direction through the core 11. An inhibit driver 13 is similarly employed to inhibit storing a binary digit 1 in any one of the cores to be selected by row select windings $X_5$ to $X_8$.

To read a binary digit stored in a selected core, such as the core 11, half-select currents are driven through row and column select windings but in the direction opposite to the half-select currents for a write operation.

The half-select currents driven through the windings $X_1$ and $Y_8$ produce an additive magnetomotive force (MMF) in the core 11. The half-select current through the remaining cores of the selected row and the selected column produce an MMF insufficient to exceed the inherent threshold of the cores. Accordingly, only the selected core 11 is switched back to its reference state. When the core 11 is switched, a voltage is produced in the sense-inhibit winding S–I which is sufficient in amplitude to be detected by a differential amplifier 14.

From the diagram it may be seen that when the half-select current is driven through the row select winding $X_1$ in a left to right direction during a read operation, signals are induced in the winding S–I by the half-selected cores in the first row, each signal being of a polarity or current direction indicated by the adjacent arrows. Since these signals are all of the same polarity, it is necessary to energize the row select winding $X_1$ sufficiently in advance of energizing the column select winding $Y_8$ to allow all of the half-select noise signals from the cores in the selected row to subside. When the column select winding $Y_8$ is energized, the selected core 11 receives sufficient MMF for it to be switched to its reference state. Cancellation of column half-select noise is achieved because half of the cores in the column are threaded by the winding S–I in one direction relative to the column winding $Y_8$ and in the opposite sense to the remaining cores in the column. The half-select noise signals induced in the winding S–I by the cores in the selected column are of the polarity or current direction indicated by the adjacent arrows. Since there are an even number of cores in the column, an odd number of half-select noise signals are induced in the winding S–I. The signal induced in the winding S–I by the selected core is, of course, not part of the noise problem. However, in an array having eight or more cores in a column, the uncancelled half-select noise of the odd core is not sufficient to prevent the differential amplifier 14 from discriminating between a binary 1 output signal and a binary 0 output signal.

Figure 2:
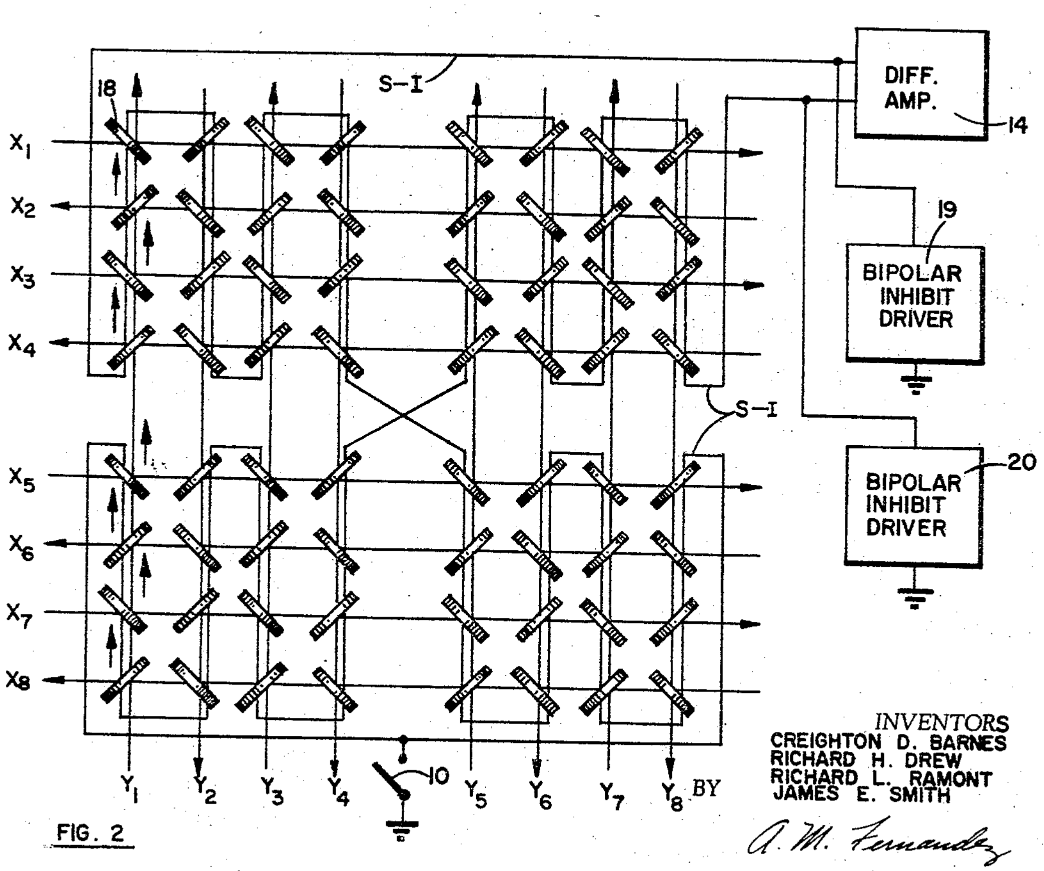
FIG. 2 is a schematic diagram of a second embodiment of the invention.
Figure 5:
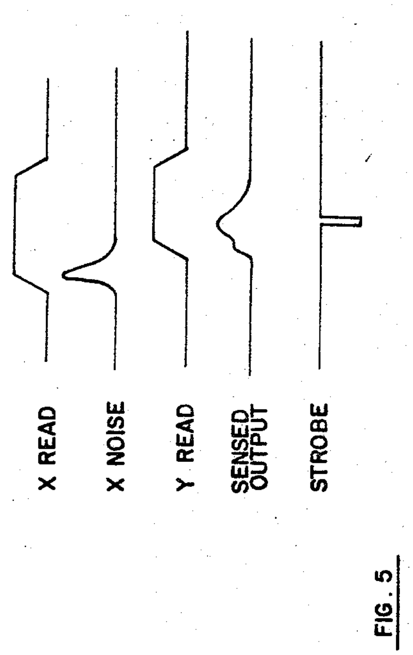
FIG. 5 is a timing diagram for a read operation of the embodiments of FIGS. 1 and 2.

FIG. 5 is a timing diagram for a read operation in the embodiments of the invention illustrated in FIGS. 1 and 2 where cancellaiton of half-select noise is provided for the column select winding only. The row select winding is energized first in order to allow the half-select noise in the selected row to subside before the column select winding is energized. That is illustrated by the first three wave forms identified by the legends X read, X noise and Y read, respectively. The sensed output from the winding S–I is then strobed by a negative pulse as indicated by the last two wave forms identified by the legends "sensed output" and "strobed."

In FIG. 2 the cores of the array are divided into four quadrants and the winding S–I is threaded through the cores of one quadrant in one sense relative to the column half select windings, and in a diagonally opposite quadrant in the opposite sense. The result is the cancellation of half-select noise between quadrants along the column select winding parallel to the sense winding S–I instead of orthogonal thereto. For instance, when a core 18 is read by the coincident half-select currents in the row winding $X_1$ and column winding $Y_1$ in directions opposite to the arrowheads which indicate direction of select current for a store operation, half-select noise signals are induced by the unselected cores in the column in the polarity or current direction indicated by the adjacent arrows. With switch 10 either open or closed to read, four signals of one polarity are induced in the winding S–I and three signals of the opposite polarity so that the half-select noise signals from all of the cores in the column except one are cancelled. However, the half-select noise signals from the unselected cores in the same row as the core 18 are of the same direction or polarity as shown so that it is necessary to energize the row select winding $X_1$ sufficiently in advance to allow the half-select noise of the unselected cores in the selected row to subside before the column select winding is energized and the output signal strobed in the differential amplifier 14.

To store a binary digit 1 in the core 18, half-select signals are driven through the row winding $X_1$ and the column winding $Y_1$ in the directions indicated by the arrowheads. To store a binary zero instead it is necessary to inhibit a binary 1 from being stored with an inhibit current driven through the sense-inhibit winding S–I by an inhibit driver 19 in a direction opposite to the half-select current through the column winding $Y_1$ which is in a direction from ground through the switch 10 to the inhibit driver 19.

It should be noted that current of that polarity will inhibit writing a binary 1 in any of the cores in the upper left quadrant but not in any of the cores in the lower right quadrant threaded by the same half of the winding S–I. Accordingly, the inhibit driver 19 must be bipolar to provide negative current for the inhibit function in the upper left quadrant and positive current for the inhibit function in the lower right quadrant. Similarly, a bipolar inhibit driver 20 provides positive current through the other half of the winding S–I for the inhibit function in the upper right quadrant and negative current for the inhibit function in the lower left quadrant.

Figure 3:
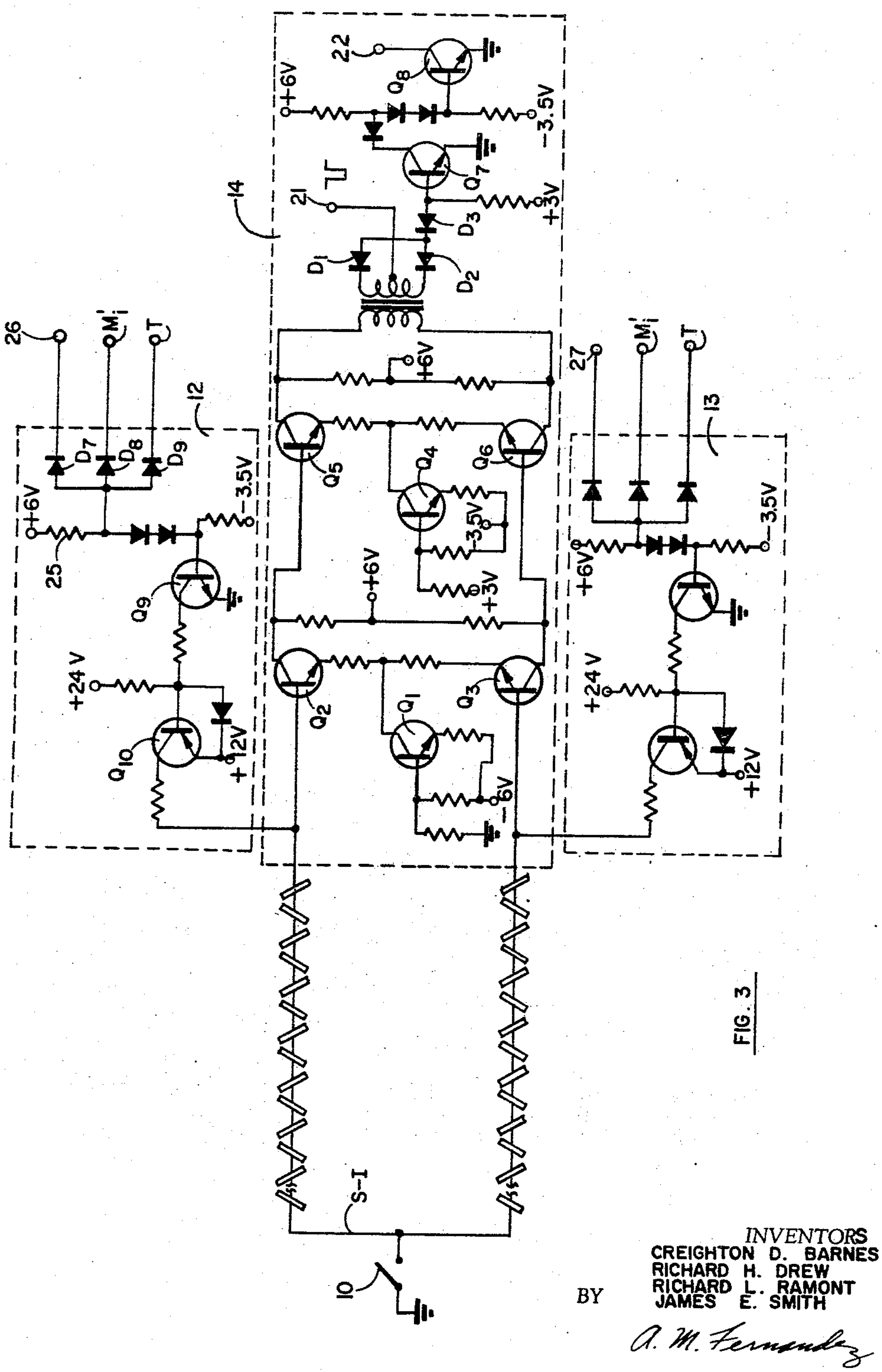
FIG. 3 is a schematic diagram of a differential amplifier and inhibit drivers for the embodiment of FIG. 1 and the preferred embodiments of FIGS. 8 and 9.

FIG. 3 illustrates a circuit diagram for the differential amplifier 14 and the inhibit drivers 12 and 13 which may be employed with the embodiment of FIG. 1. The amplifier 14 includes two cascaded stages. The first includes NPN transistors $Q_1$, $Q_2$ and $Q_3$ and the second includes transistors $Q_4$, $Q_5$ and $Q_6$. Since the switch 10 is open during a read operation, the cascaded stages amplify only the difference signal and reject common-mode noise signals.

The output of the second stage is transformer coupled to a transistor strobe switch $Q_7$. Since the output of the core memory is bipolar, a full-wave rectifier comprising diodes $D_1$ and $D_2$ are provided. A negative strobe pulse is applied to an input terminal 21 when the initial transients have subsided. In operation, the transistor $Q_7$ is normally conducting and the strobe input terminal 21 is at +6 volts. When a negative strobe pulse is applied, the terminal 21 is driven to substantially ground potential. If a binary 1 signal is being sensed in the winding S–I, a negative signal is coupled by a diode $D_3$ to the base of the transistor $Q_7$ cutting it off, thereby driving a transistor $Q_8$ to saturation to supply 50 ma. to a load connected to terminal 22. Amplitude discrimination of the trobe signal is accomplished by the voltage drops in diodes $D_1$ or $D_2$ and $D_3$.

The inhibit drivers, such as the inhibit driver 12, comprise a high gain NAND gate $Q_9$ the output of which is coupled to a common emitter amplifier $Q_{10}$. The NAND gate comprises three diodes $D_7$, $D_8$ and $D_9$ having their anodes connected to a source of +6 volts by a resistor 25 to selectively energize the inhibit driver 12. In that manner inhibit current is driven through one half of the sense-inhibit winding S–I when a binary 0 is to be written into a core threaded by that half of the winding. The return path for the current is through the switch 10 which is closed during a read operation.

The inhibit driver 12 is selected by a signal applied to an input terminal 26 and is activated at a time T but only if a zero is to be written in response to a signal $M_1'$. If the X drive windings are to be selected by decoding positions $A_1$ to $A_3$ of an address register, the signal $A_3'$ may be employed to select the inhibit driver 12 and the signal $A_3$ applied to a terminal 27 to select the inhibit driver 13 in the system of FIG. 1.

Figure 4:
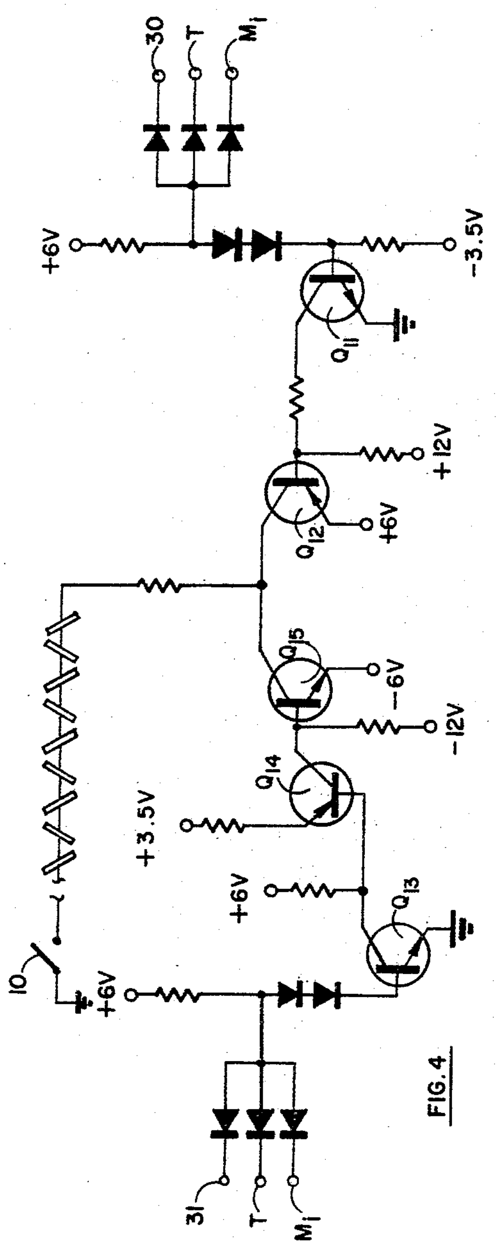
FIG. 4 is a circuit diagram of a bipolar inhibit driver for the embodiment of FIG. 2.

FIG. 4 illustrates a circuit diagram for a bipolar inhibit driver suitable for use with the system illustrated in FIG. 2. It comprises a positive inhibit current driver (transistors $Q_{11}$ and $Q_{12}$) similar to the inhibit driver 12 of FIG. 3 and a negative inhibit current driver (transistors $Q_{13}$, $Q_{14}$ and $Q_{15}$). The transistor $Q_{13}$ together with its input coupling diodes functions as a selecting NAND gate. The transistor $Q_{14}$ inverts the output of the transistor $Q_{13}$ and drives the NPN output transistor $Q_{15}$ into conduction. The selecting logic terms for the respective input terminals 30 and 31 of the inhibit driver circuit used as the inhibit driver 19 of FIG. 2 are $A_3A_6$ and $A_3'A_6'$. The respective selecting logic terms for the corresponding input terminals of the circuit used as the inhibit driver 20 of FIG. 2 are $A_3'A_6$ and $A_3A_6'$.

Figure 6:
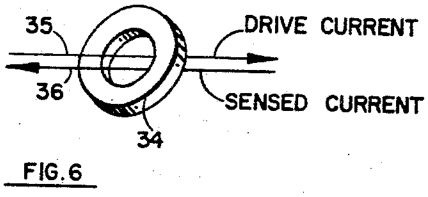
FIG. 6 is an illustration of a core threaded by two single turn windings of the same sense.
Figure 7:
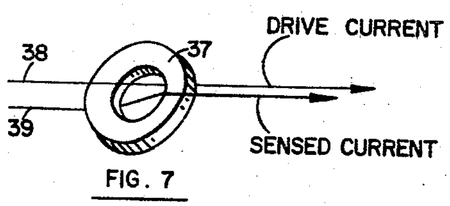
FIG. 7 illustrates a core threaded by two single turn windings of the opposite sense.

To facilitate an understanding of the preferred embodiments illustrated in FIGS. 8 and 9, the operation of an inductive coupling between two single-turn windings is first described with reference to FIGS. 6 and 7. In FIG. 6 a core 34 is threaded by two conductors 35 and 36 in the same direction to provide single turn windings of the same sense. If current is driven through the conductor 35 in the direction indicated, a single-turn winding of a given sense is provided. If a current is conducted through the conductor 35 in the opposite direction, a single turn winding of the opposite sense is provided. Thus the sense of a single turn winding is a function of the current direction. Since the windings 35 and 36 are in the same direction, if the conductor 35 is energized by current in the direction indicated, the current induced in the conductor 36 is in the opposite direction as indicated. In other words, when a current enters a single turn winding at one end of a core to tend to switch it toward a reference state, a current is induced in all other single turn windings of the same sense in the opposite direction.

If the direction of current cannot be reversed in order to reverse the sense of a single turn winding, the direction of the conductor through the core must be reversed. FIG. 7 illustrates a core 37 with a conductor 38 threaded in one direction to provide a single turn winding of a given sense and a conductor 39 threaded in the opposite direction to provide a single turn winding of the opposite sense. Accordingly, the current induced in one conductor when the other is energized is in the same direction as the current in the other.

In FIG. 1, the sense-inhibit winding S–I is threaded through the cores row by row to provide single turn windings of a given sense in the first four rows and single turn windings of a second sense in the last four rows, taking the sense of a single turn winding in a given one of the column drive windings as a reference in order that half of the cores in the column be provided with single turn windings of a sense opposite to the single turn windings of the other half of the column for noise cancellation of the column half-select current noise induced in the sense winding S–I. During a write operation, the inhibit function is appropriately provided for any core in a given column by providing inhibit current in one direction for cores having the common sense inhibit winding threaded in one direction to provide single turn windings of a given sense and current in the opposite direction in the remaining half of the sense-inhibit winding S–I.

In FIG. 2 the array was divided into quadrants and the sense-inhibit winding S–I so threaded as to provide an inhibiting action for the column select currents while at the same time having half the cores in a given column threaded opposite to the other half of the cores to provide noise cancellation for the column half-select currents induced in the sense-inhibit winding. This necessitated reversing the direction of current in the sense-inhibit winding S–I for the inhibit function depending upon which quadrant of an associated pair includes the selected core. To obviate having to provide negative current in the sense-inhibit winding S–I for the inhibit function in the upper and lower right hand quadrants of the array, either the direction of the row and column select windings may be reversed through each core in those quadrants, or the sense-inhibit winding S–I may be threaded through each core in those two quadrants in the opposite direction.

Figure 8:
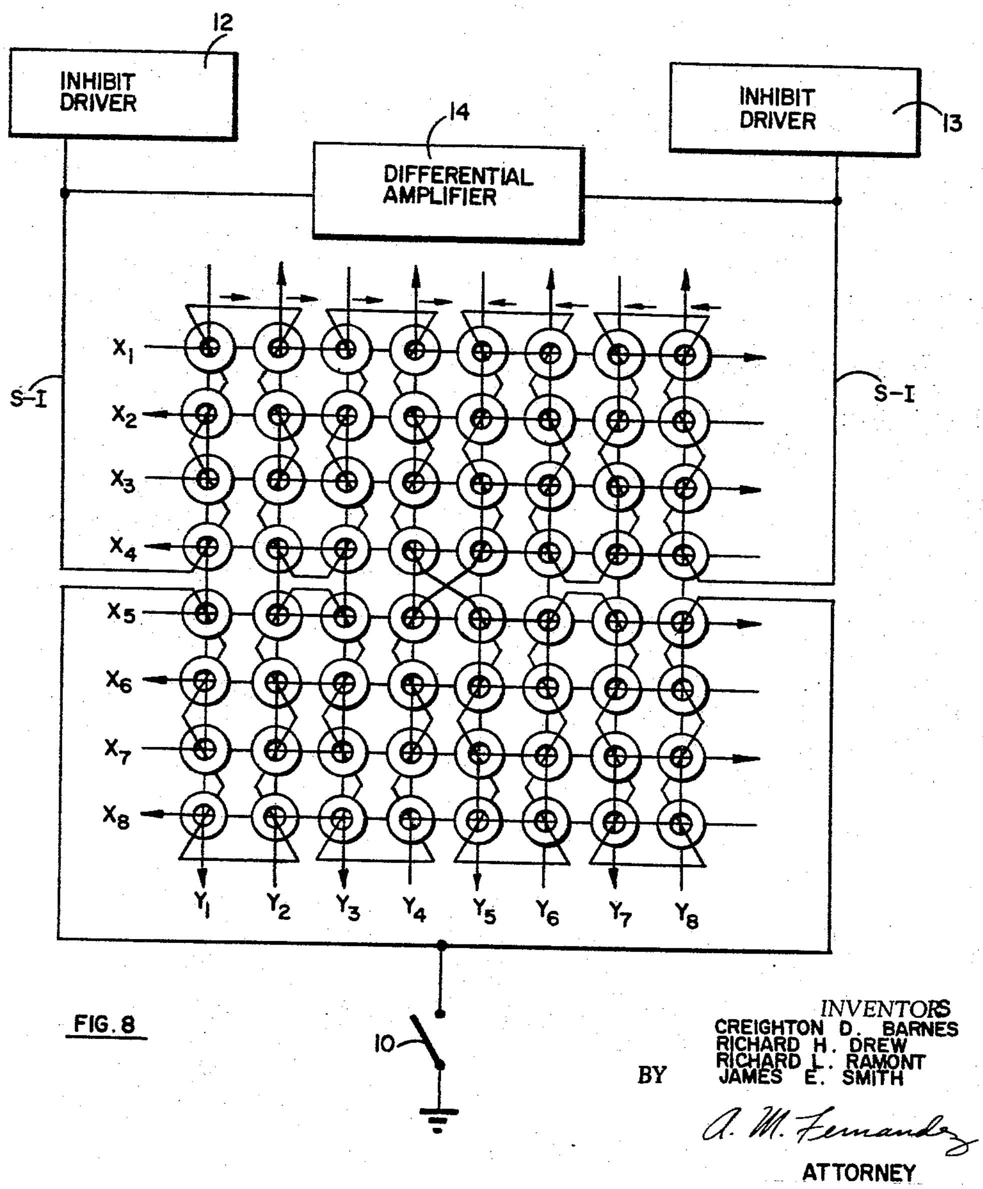
FIG. 8 is a schematic diagram of a preferred embodiment.

In the preferred embodiment of FIG. 8, the necessity of providing negative current for the inhibit function in the upper and lower right hand quadrants of the array has been obviated by threading all of the cores in those quadrants with the row and column select windings in the opposite direction. That does not in any manner disturb the cancellation of column half-select noise induced in the sense winding because half the cores in a given one of columns $Y_5$ to $Y_8$ are still provided with single turn windings of a given sense and the remaining cores with single turn windings of the opposite sense. However, it does provide as an added benefit the cancellation of row half-select noise induced in the sense-inhibit winding because half of the cores in a given row are now threaded by the sense-inhibit winding in a given sense and the remaining cores in the opposite sense. For instance, assuming that the row select winding $X_1$ is energized in the direction indicated for a read operation, the signals induced in the sense-inhibit winding S–I by the action of that current through the first four cores on the left is to the right as indicated by the four arrows above those four cores. In the remaining four cores of that row, the sense-inhibit winding is threaded in the same direction as the column select winding $X_1$ so that the current induced in the sense-inhibit winding by the action of the current through the row select winding $X_1$ is in the opposite direction as indicated by the four arrows above those cores. Tracing the circuit of the sense-inhibit winding from the left hand side of the differential amplifier to the right hand side, it is seen that four currents of one polarity or direction are induced in the first half of the sense-inhibit winding and four currents of the opposite polarity or direction are induced in the second half of the sense-inhibit winding. In that manner full cancellation of half-select noise is provided for both the row half-select current and the column half-select current.

Figure 9:
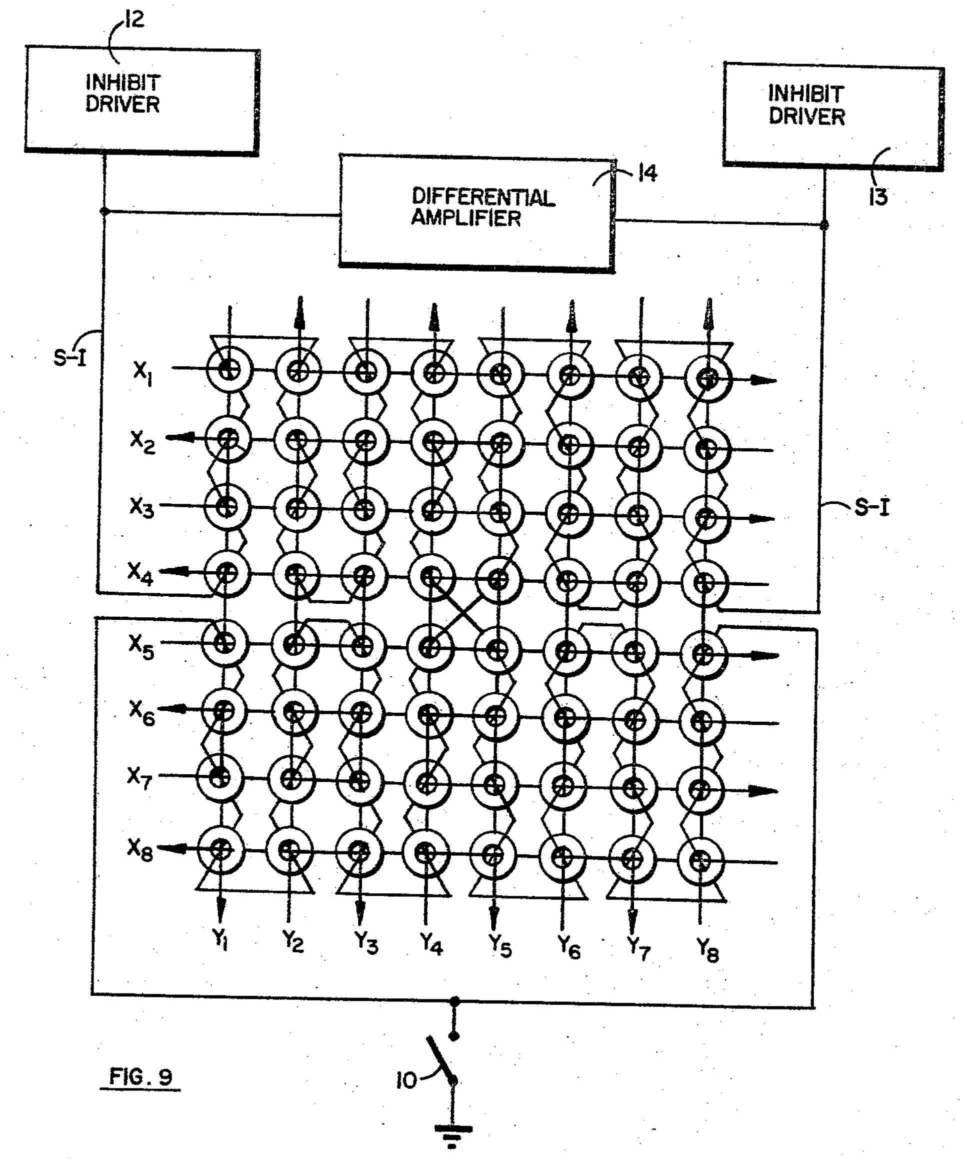
FIG. 9 illustrates an alternate geometry for the sense-inhibit winding of the preferred embodiment illustrated in FIG. 8.

In FIG. 9, the direction of the row and column select windings through the cores in the upper and lower right hand quadrants are the same as in FIG. 2 but the direction of the sense-inhibit winding S–I through each of the cores in those quadrants has been reversed. Again the cancellation of column half-select noise induced in the sense-inhibit winding has not been disturbed but the added benefit of row half-select noise cancellation has been provided by threading half the cores with the sense-inhibit winding in a given row in one direction and half the cores in the opposite direction.

As noted hereinbefore, the direction of the select currents in the row and column select windings are alternated in order to facilitate making external connections between planes. However, the direction of current through each row or each column may be made the same without changing the sense-inhibit winding by also reversing the direction of the row and column select windings in which the currents are reversed. For instance, if it is desired to have the direction of current for all of the row select windings in the embodiment of FIG. 9 to the right, the direction of current in the second winding $X_2$ should be reversed. Since that would reverse the sense of the winding through each core, the original sense can be restored by threading the winding $X_2$ through each of the cores in that column in the opposite direction.

The inhibit drivers 12 and 13 of FIG. 3 may be employed with the preferred embodiments of FIGS. 8 and 9 without any modification except in the logic to be applied to the select input terminals 26 and 27. The logic input to the terminal 26 to select the inhibit driver 12 is $A_3A_6+A_3'A_6'$ and the logic term to the input terminal 27 to select the inhibit driver 13 is $A'_3A_6+A_3A'_6$ The differential amplifier 14 of FIG. 3 may also be employed without change in the preferred embodiments of FIGS. 8 and 9. The only change required in order to use that differential amplifier with the preferred embodiments to advantage is in the timing of the row and column half-select currents. Since full cancellation of row and column half-select noise is provided, it is not necessary to stagger the row and column half-select currents in the manner illustrated with reference to FIG. 5. Instead, both half-select currents may be applied simultaneously to read a selected core.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claim is therefore intended to cover and embrace any such modifications, within the limits only of the true spirit and scope of the invention.

What is claimed is:

In a coincident-current magnetic core memory, a plurality of toroidal magnetic cores arranged in quadrants of a rectangular coordinate array having columns parallel to a first axis and rows parallel to a second axis, a sense conductor passing in sequence through all cores of a first quadrant column by column, then all cores of a diagonally opposite quadrant column by column, and finally all cores of the remaining quadrants column by column, thereby providing a winding of a given sense through each core, a first plurality of conductors, one for each row of two adjacent quadrants, a given conductor providing in the first half thereof a winding of said given sense in cores of one quadrant and in the second half thereof of an opposite sense in cores of the other quadrant, a second plurality of conductors one for each row of the remaining two adjacent quadrants, a given conductor providing in the first half thereof a winding of said opposite sense in cores of one quadrant and in the second half thereof of said given sense in cores of the other quadrant, and a third plurality of conductors, one for each column of the entire array, a given one providing a winding through each core of an associated column of the same sense as said first and second plurality of conductors through each core, means for connecting the center of said sense conductor to a source of reference potential during a write operation, a first inhibit current driver connected to one end of said sense conductor for inhibiting the operation of current through one of said third plurality of conductors in either of two pre-determined diagonally opposite quadrants, and a second inhibit current driver connected to the other end of said sense conductor for inhibiting the operation of current through one of said third plurality of conductors in either of the remaining two diagonally opposite quadrants, a differential amplifier having a first input terminal connected to one end of said sense conductor and a second input terminal connected to the other end of said sense conductor.

References Cited

UNITED STATES PATENTS

| | | | |
|---|---|---|---|
| 3,161,860 | 12/1964 | Grooteboer | 340—174 |
| 3,191,163 | 6/1965 | Crawford | 340—174 |
| 3,278,915 | 10/1966 | Joseph | 340—174 |

BERNARD KONICK, *Primary Examiner.*

S. URYNOWICZ, *Assistant Examiner.*